(12) United States Patent
Sutt, Jr.

(10) Patent No.: US 7,395,925 B2
(45) Date of Patent: Jul. 8, 2008

(54) PALLET NAIL WITH ENLARGED HEAD

(75) Inventor: Edward G. Sutt, Jr., Jamestown, RI (US)

(73) Assignee: Stanley Fastening Systems, L.P., East Greenich, RI (US)

( * ) Notice: Subject to any disclaimer, the term of this patent is extended or adjusted under 35 U.S.C. 154(b) by 360 days.

(21) Appl. No.: 10/799,766

(22) Filed: Mar. 15, 2004

(65) Prior Publication Data
US 2004/0173483 A1 Sep. 9, 2004

Related U.S. Application Data

(63) Continuation-in-part of application No. 10/667,884, filed on Sep. 23, 2003, now abandoned, which is a continuation-in-part of application No. 10/060,411, filed on Feb. 1, 2002, now abandoned, and a continuation-in-part of application No. 10/060,413, filed on Feb. 1, 2002, now Pat. No. 6,758,018, and a continuation-in-part of application No. 10/067,150, filed on Feb. 1, 2002, now abandoned.

(51) Int. Cl.
B65D 85/24 (2006.01)

(52) U.S. Cl. .................. 206/345; 206/338; 411/442

(58) Field of Classification Search ......... 206/338–340, 206/345; 108/57.17, 57.21, 51.11, 56.1; 411/442–444
See application file for complete search history.

(56) References Cited

U.S. PATENT DOCUMENTS

| 159,777 | A | 2/1875 | Sturtevant |
|---|---|---|---|
| 430,187 | A | 6/1890 | Kendall |
| 1,511,711 | A | 10/1924 | Atwell |
| 2,126,585 | A | 8/1938 | Stone |
| 3,031,670 | A | 5/1962 | Sillars |
| 3,083,369 | A | 4/1963 | Peterson |
| 3,137,858 | A | 6/1964 | Powers |
| 3,167,778 | A | 2/1965 | Decot et al. |
| 3,851,759 | A | 12/1974 | Young et al. |
| 3,861,527 | A | 1/1975 | Perkins |

(Continued)

FOREIGN PATENT DOCUMENTS

AU 746914 6/1998

(Continued)

OTHER PUBLICATIONS

Daniel S. Merrick, "Cycle Comparison Testing of Light Wood Framed Sheer Walls," San Jose State University, 1999.

(Continued)

Primary Examiner—Luan K Bui
(74) Attorney, Agent, or Firm—Studebaker & Brackett PC; Tim L. Brackett

(57) ABSTRACT

A pallet having wooden boards secured together by nails which achieve approved operating characteristics. The nail is embodied in a package secured together by a pair of parallel wires welded to the shanks. Each nail having a shank diameter between 0.078 in. and 0.085 in., each nail is manufactured from steel wire and has a length between 1.50 in. and 2.25 in. The ratio of the head diameter to the shank diameter of each nail is between 2.70 and 3.37.

3 Claims, 5 Drawing Sheets

U.S. PATENT DOCUMENTS

| | | | |
|---|---|---|---|
| 4,002,098 | A | 1/1977 | Colechia |
| 4,011,785 | A | 3/1977 | Schrepferman |
| 4,679,975 | A | 7/1987 | Leistner |
| 4,804,088 | A | 2/1989 | MacDonald |
| 4,815,910 | A | 3/1989 | Potucek |
| 4,836,372 | A | 6/1989 | Shelton |
| 4,863,089 | A | 9/1989 | McCardle et al. |
| 4,877,135 | A | 10/1989 | Gabriel et al. |
| 4,971,503 | A | 11/1990 | Barnell et al. |
| 5,005,699 | A | 4/1991 | Kawashima et al. |
| 5,033,181 | A | 7/1991 | Lat et al. |
| 5,056,976 | A | 10/1991 | Sygnator et al. |
| 5,140,715 | A | 8/1992 | Monacelli |
| 5,143,501 | A | 9/1992 | Leistner et al. |
| 5,409,111 | A | 4/1995 | Takumi |
| 5,415,511 | A | 5/1995 | Damron |
| 5,456,635 | A | 10/1995 | Monacelli |
| 5,476,687 | A | 12/1995 | Gabriel et al. |
| 5,482,419 | A | 1/1996 | Leistner |
| 5,622,024 | A | 4/1997 | Habermehl |
| 5,642,974 | A | 7/1997 | Gabriel et al. |
| 5,673,629 | A | 10/1997 | Ginnow |
| 5,909,993 | A | 6/1999 | Leistner |
| 5,921,736 | A | 7/1999 | Habermehl |
| 5,934,465 | A | 8/1999 | Abbruzzese et al. |
| 5,960,721 | A | 10/1999 | Huetteman et al. |
| 5,967,316 | A | 10/1999 | Abbruzzese et al. |
| 6,010,291 | A | 1/2000 | Schwingle |
| 6,086,305 | A | 7/2000 | Lat et al. |
| 6,422,447 | B1 | 7/2002 | White et al. |
| 6,431,430 | B1 | 8/2002 | Jalbert et al. |
| 6,557,703 | B1 | 5/2003 | Leitner |
| 6,584,915 | B1 | 7/2003 | Rogers |
| 6,758,018 | B2 | 7/2004 | Sutt, Jr. |
| 6,805,525 | B2 | 10/2004 | Oswald |
| 2003/0006166 | A1 | 1/2003 | Leitner |
| 2003/0145544 | A1 | 8/2003 | Sutt, Jr. |

FOREIGN PATENT DOCUMENTS

| | | |
|---|---|---|
| DE | 41 41 612 A1 | 6/1993 |
| EP | 0 367 936 A2 | 5/1990 |
| EP | 0 367 936 A3 | 10/1990 |
| EP | 0 460 845 A1 | 12/1991 |
| EP | 0 672 482 A1 | 9/1995 |
| EP | 0 697 531 A1 | 2/1996 |
| EP | 1 022 346 A1 | 7/2000 |
| FR | 2 757 830 A1 | 7/1998 |

OTHER PUBLICATIONS

Manasquan Premium Fasteners Web Site, printed Jan. 12, 2004, copyright 2003.

Installation Instructions, "Welsh Mountain State Inc,", Oct. 18, 2000.

"Application Guidelines", Maze Nails Online Catalog, 1995.

Standard Specification for Driven Fasteners: Nails, Spikes, and Staples, American Society for Testing and Materials, p. 1-37 (Jan. 1996).

"National Evaluation Report," National Evaluation Service, Inc., p. 1-43, Sep. 1, 1997.

Stainless Steel Annular Thread Common Nails, Manasquan Premium Fasteners, Oct. 3, 2001.

European Search Report, Application No. 04257016.8-2424, dated May 9, 2006, Applicant- Stanley Fastening Systems L.P.

Sutt, Jr., "Pallet Nail With Enlarged Head", U.S. Appl. No. 11/482,729, filed Jul. 10, 2006. (pending).

Sutt, Jr., "Pallet Nail with Enlarged Head", U.S. Appl. No. 10/667,884, filed Sep. 23, 2003 (pending).

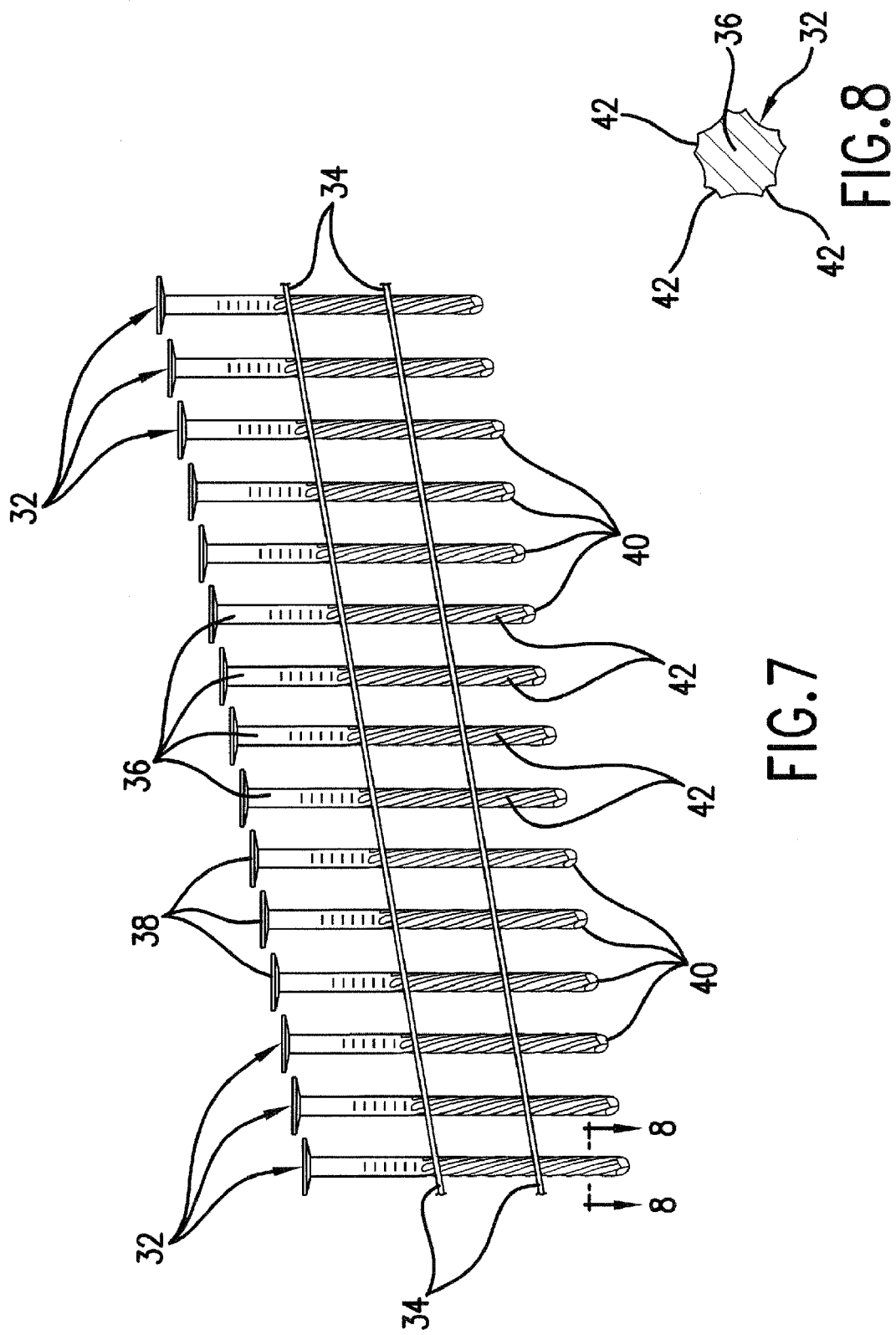

PALLET NAIL WITH ENLARGED HEAD

This application is a continuation-in-part of U.S. Application No. 10/667,884, filed Sep. 23, 2003, now abandoned, which in turn is a continuation-in-part of U.S. application Ser. Nos.10/060,411, 10/067,150, both now abandoned, and application Ser. No.6,758,018, all filed Feb. 1, 2002, all of which are hereby incorporated by reference in their entireties.

BACKGROUND OF THE INVENTION

The above-identified application relates to packaged nails suitable for pallet constructions.

Pallets are conventionally constructed of wood boards. An example of a typical pallet is formed in three layers. The bottom layer includes three parallel boards of a size, for example, of ¾"×3" oriented with the larger disposed sides horizontally. The middle layer includes heavier boards of a size, for example, of 1¼"×3⅜. These boards are oriented with the larger sides disposed vertically and disposed with their longitudinal extent extruding perpendicular to the longitudinal extent of the bottom boards. These heavier middle boards may be recessed along their lower surfaces between the bottom boards to accommodate the forks of a conventional fork lift truck. The top layer may include a series of parallel boards like those of the bottom layer, as for example, seven, oriented in the same way as the bottom layer but more closely spaced. Typically, the boards are held together by nails. In many cases, these nails are packaged as dual wire mounted coils in a form to be driven by a pneumatically actuated fastener driving device. Typically, two nails are driven through each of the bottom and top boards into each of the three heavier middle boards.

SUMMARY OF THE INVENTION

A feature of the nail disclosed and claimed in the aforesaid 10/667,884 application resides in the ratio of the head to shank diameter of between 2.70 and 3.37 in the combinations defined by the claims of that application. It has since been discovered that by reducing the shank diameter, material savings can be achieved while at the same time improving overall performance. This is primarily due to the fact that for many years pallet nails have been made to standard dimensions, without careful rationalization of whether those dimensions are ideal for use in pallet construction. The inventors have found that for conventional steel wire pallet nails, a limiting factor on performance is board pull through, whereby a pallet board is pulled over and past the head of the pallet nails. The inventors thus determined that a pallet nail having a head diameter that is larger than what is conventional for what is considered in the industry to be a quality pallet nail would be advantageous. At the same time, the inventors have determined that the shank diameter of the conventional quality pallet nail could be reduced, to achieve material savings, without any significant decrease in nail withdrawal, shear characteristics, etc. The amount of material savings in the shank more than make up for any increase in the head. The present application is based upon the concept that it is possible to reduce shank diameter and hence the amount of metal per nail in conjunction with the ratio feature and still maintain effectiveness in the characteristics necessary for pallet use, such as fastener withdrawal resistance, as determined by ASTM D-1761, fastener load slip or shear resistance, as determined by ASTM D-1761, pallet diagonal impact rigidity, as determined by the corner drop test of ASTM D-1185, Section 9.3, and the top deck end board impact resistance as determined by ASTM D-1185, Section 9.42.

In accordance with the principles of the present invention, these enhanced operating characteristic are obtained by providing a pallet construction in which the bottom and top boards are secured to the heavier middle boards by nails which are constructed in accordance with the principle of the present invention so that each nail has a substantially round head having a flat top surface suitable for being driven into a flush relationship with an exterior surface of a pallet wooden board and a bottom surface, the head further having a head diameter, the head diameter providing a bottom head surface area for engaging a flat surface of a top or bottom pallet wooden board to enhance resistance to pallet wooden board separation by head pull through. Each nail includes a single elongate shank integral with the head and extending from the head bottom surface, the elongate shank further including a point opposite the head, and a plurality of surface deformations formed on the shank, the surface deformations being configured to provide an enhanced resistance to pallet wooden board separation by withdrawal of the nail shank from a pallet wooden board. The shank further has a substantially round cross-section having a shank diameter between 0.078 in. and 0.085 in. Each nail is manufactured from steel wire; each nail has a length defining the distance from the head to the shank point, the length being between 1.50 inches and 2.25 inches; and the ratio of the head diameter to shank diameter of each nail is between 2.70 and 3.37.

The invention also embodies a method of making a pallet utilizing the aforesaid nails and a coiled package of the aforesaid nails held in collated relation by suitable flexible elongated structure such as parallel wire as well as the construction of each nail itself.

BRIEF DESCRIPTION OF THE DRAWINGS

FIG. 7 is an elevational view of a flattened segment of a coiled package of nails embodying the principles of the present invention; and FIG. 8 is an elevational view of another flattened segment of a coiled package of nails embodying the principles of the present invention.

DETAILED DESCRIPTION OF A PREFERRED EMBODIMENT OF THE INVENTION

Figure 1:
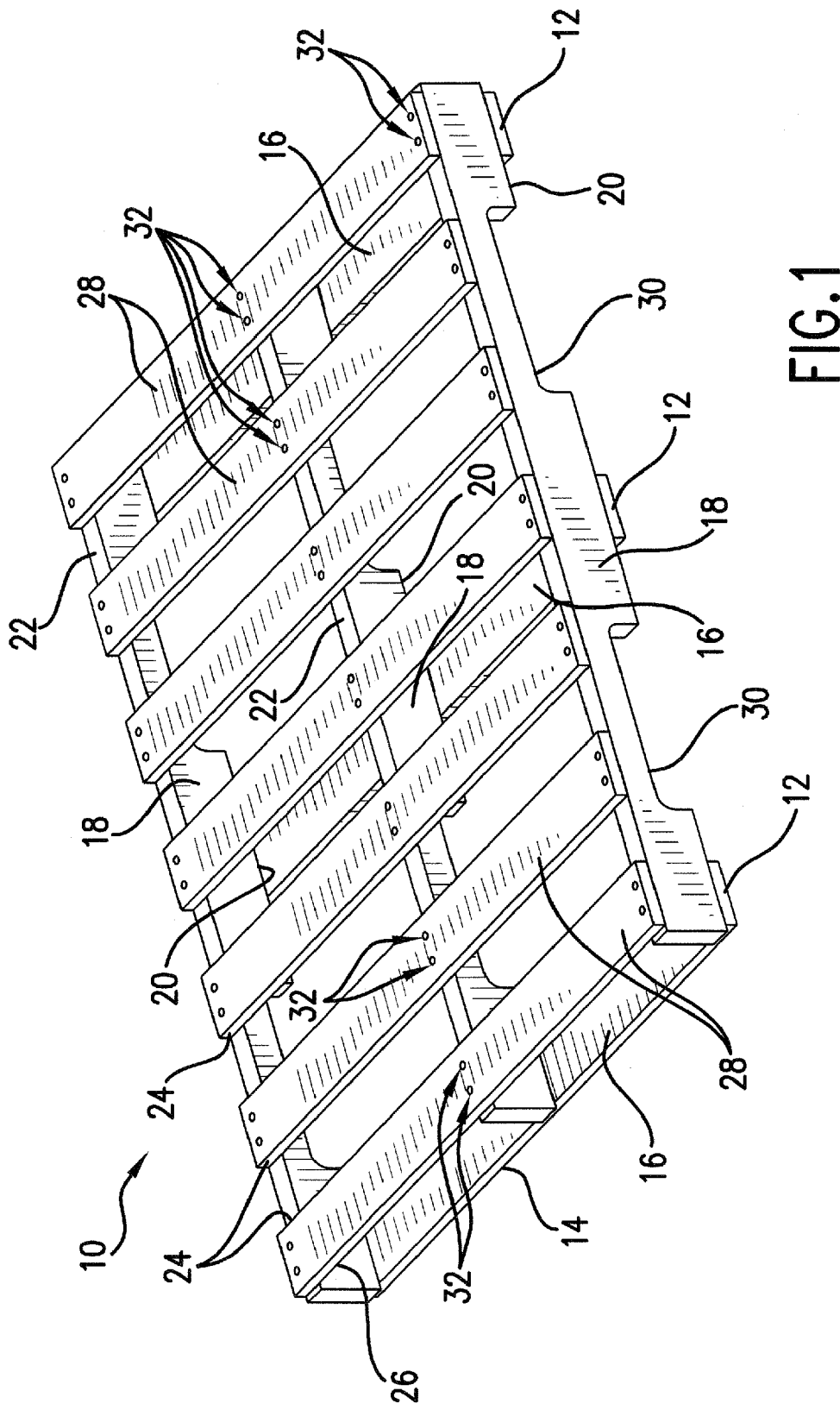
FIG. 1 is a perspective view of a pallet embodying the principles of the present invention looking down at one corner thereof.
Figure 2:
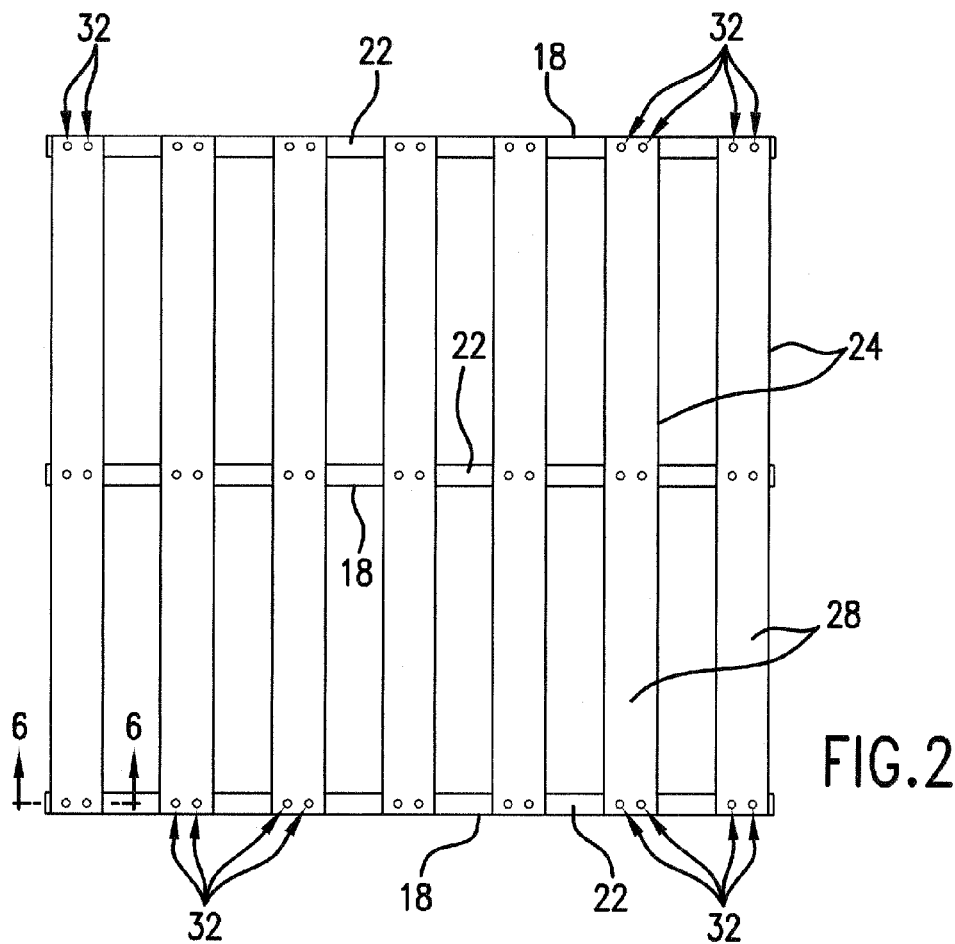
FIG. 2 is a top plan view of the pallet shown in FIG. 1.
Figure 3:
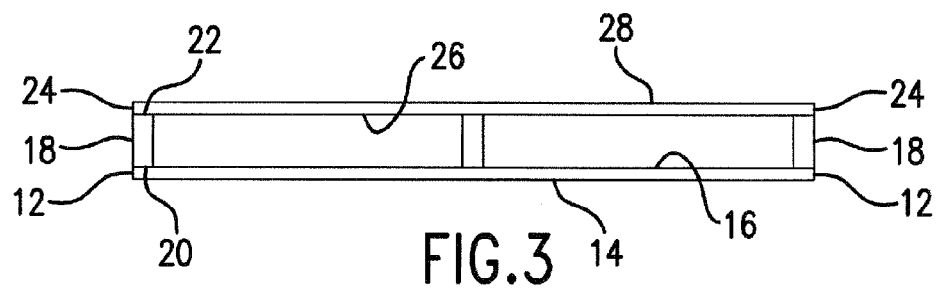
FIG. 3 is an end elevational view of the pallet shown in FIG. 1, the opposite end view being the same.
Figure 4:
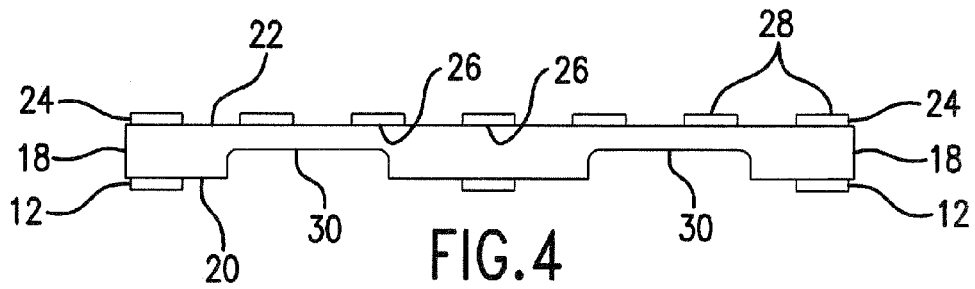
FIG. 4 is a side elevational view of the pallet shown in FIG. 1, the opposite side view being the same.
Figure 5:
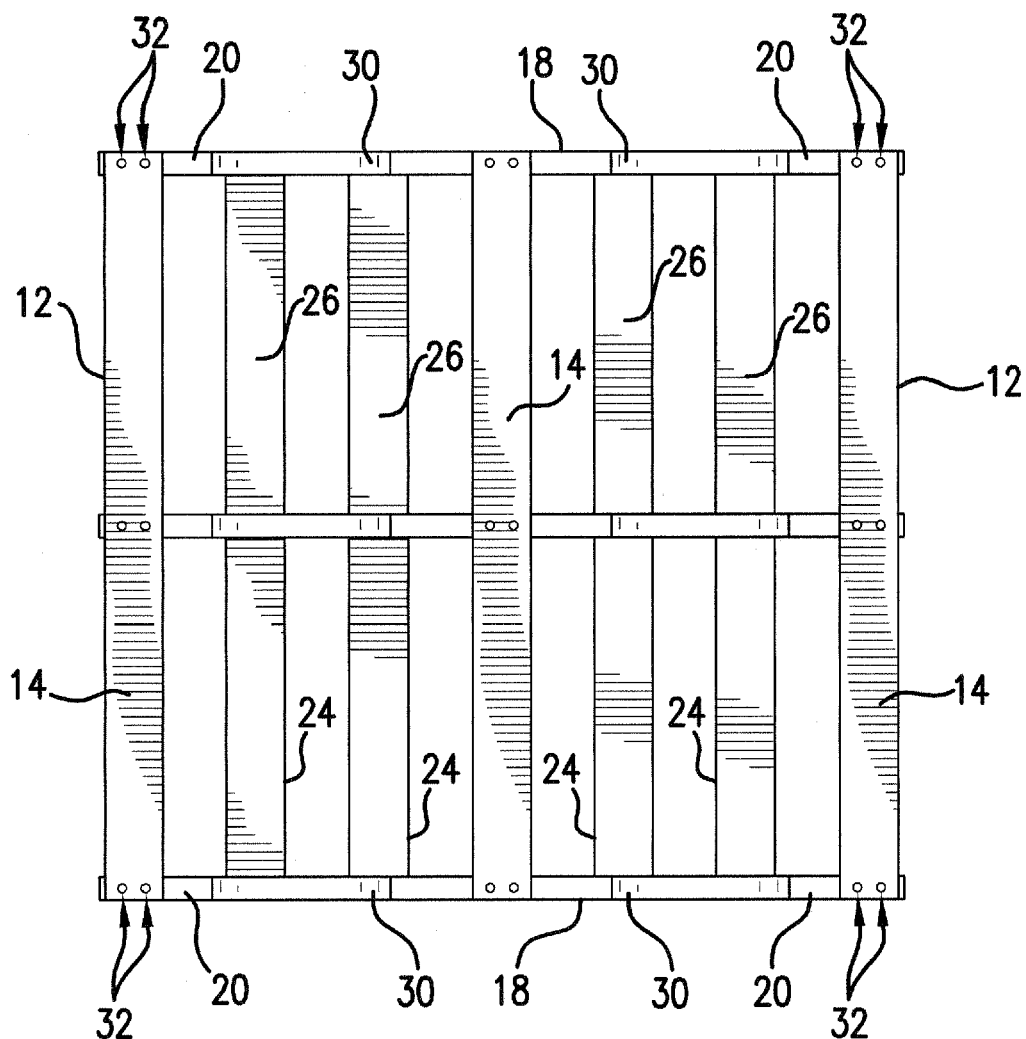
FIG. 5 is a bottom plan view of the pallet shown in FIG. 1.
Figure 6:
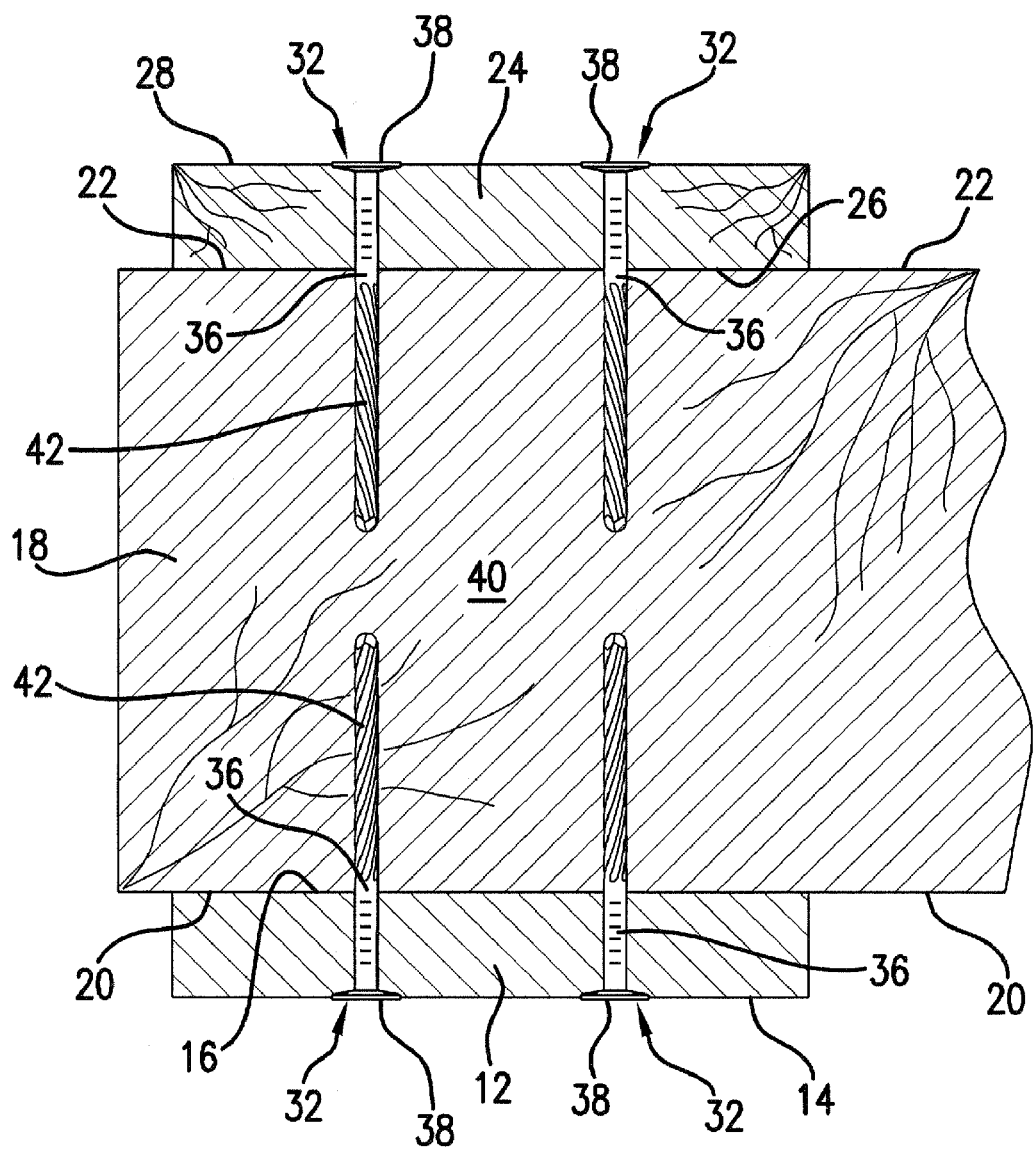
FIG. 6 is an enlarged fragmentary sectional view taken along the line 6-6 of FIG. 2.

Referring now more particularly to the drawings therein shown in FIGS. 1-6, a pallet, generally indicated at 10 which embodies the principles of the present invention. The pallet 10 includes a plurality of bottom wooden boards 12 having parallel bottom and top flat surfaces 14 and 16. The bottom flat surfaces 14 are disposed in a position to engage a horizontal surface when the pallet 10 is supported on a horizontal surface in accordance with its usual mode of usage. As shown, there are three bottom boards 12 disposed in parallel relation with respect to one another at opposite sides or ends of the pallet and in the central portion of the pallet.

The pallet 10 also includes a plurality middle wooden boards 18, each having parallel bottom and top ends 20 and 22. As shown, there are three middle boards 18 interrelated with respect to one another in parallel relation and with respect to the bottom boards 12 in perpendicular relation. The three middle boards 18 are oriented in the pallet 10 like the bottom boards 12, that is, at opposite ends or sides of the pallet 10 and in the central portion thereof. Each middle board 18 is mounted on the bottom boards 12 with the bottom end 20 of each middle board 18 in engagement with the top flat surface 16 of the bottom boards 12.

The pallet 10 also includes a plurality of top wooden boards 24 having parallel bottom and top flat surfaces 26 and 28. As shown, there are seven top boards 24 which are interrelated with respect to one another in equally spaced parallel relation and with respect to the middle boards 18 in perpendicular relation. The top boards 24 are mounted on the middle boards 18 with the bottom flat surfaces 26 of the top boards 24 in engagement with the top end surfaces 22 of the middle boards.

The middle boards 18 of the pallet 10 have their lower portions recessed, as indicated at 30, at positions between the bottom boards 12. The recesses 30 are spaced apart and configured to receive the forks of a conventional fork lift truck.

In accordance with the principles of the present invention, the boards 12, 18 and 24 of the pallet 10 are secured together by a series of steel nails, each of which is generally indicated at 32. As shown, two spaced nails extend through each bottom and top board 12 and 24 and into a middle board 18 at the position of engagement therewith.

In accordance with the principles of the present invention, the nails 32 are initially in a collated package suitable to be driven by conventional power operated fastener driving devices, examples of which are disclosed in U.S. Pat. Nos. 5,683,024 and 4,858,812, the disclosures of which are hereby incorporated by reference into the present specification. The package may be in stick formation or coil formation, an example of a coil formation package used with the device of the patent is disclosed in U.S. Pat. Nos. 3,450,255; 3,543,987; and 4,319,705, the disclosures of which are hereby incorporated by reference into the present specification.

FIG. 7 illustrates a number of collated nails 32 held in collated relation by a pair of wires 34 welded to shanks 36 of the nails 32. The collation configuration of the nails 32 is parallel and in generally longitudinally coextensive relation. The nails as shown, are slightly offset longitudinally so that the collated array is slightly angled to accommodate a slightly downwardly inclined fastener feed track of a driving device leading from the coil container to the fastener drive track of the device. This configuration makes a domed coil formation easier to form with the heads of each volute of the coil being disposed below the heads of the preceding volute. Flat coils can be made by positioning the heads of alternate volumes above the heads of the preceding volute rather than below.

Integrally formed at the upper end of the shank 36 of each nail 32 is a substantially round head 38 having a flat top surface suitable for being driven into a flush relationship with a flat surface of a bottom or top pallet board 12 or 24. The head 38 has a head diameter, providing an enlarged bottom head surface area for engaging the exterior surface of the pallet board 12 or 24 to enhance resistance to pallet board separation by head pull through.

The elongate shank 36 extends from the bottom surface of the head 38 and includes a point 40 opposite the head 38. The point 40 of each nail 32 may be of a blunt diamond or a blunt chisel configuration. Alternatively, the point 40 may be substantially flat and parallel to the head 38.

The shank 36 also includes a plurality of surface deformations (e.g., spiral flutes, rings, etc.) formed on the exterior periphery of the shank 36 configured to provide an enhanced resistance to pallet board separation by withdrawal of the nail shank from a pallet board 12 or 24. Preferably, the shank 36 has a substantially round cross-section having a shank diameter between 0.078 in. and 0.085 in.

Each nail 32 is manufactured from steel wire. Each nail 32 has a length defining the distance from the head 38 to the shank point 40 of between 1.50 inches and 2.25 inches. The ratio of the head diameter to shank diameter of each nail 32 is between 2.70 (i.e., 2.70:1) and 3.37 (i.e., 3.37:1). More preferably, the ratio is between 2.75 and 2.95.

Preferably, the surface deformations of each nail 32 are in the form of a plurality of spiral flutes 42 extending radially outwardly from the shank 36, thus forming a screw shank. As shown, the plurality of flutes 42 includes four equally spaced flutes 42 each having a spiral configuration which extends once or somewhat more than once around the shank 36 of each nail 32. The flutes 42 remain uninterrupted at the regions where wire collation 34 is welded thereto. This is achieved by a welding operation.

In another embodiment, shown in FIG. 8, the surface deformations of each nail 32 are in the form of a plurality of rings 44 extending radially outwardly from the shank 36, thus forming a ring shank.

The nails 32 may be coated with a polymer coating composition that facilitates driving of the nail by slightly melting and thus acting as a lubricant during driving into a pallet board, and then subsequently acting as an adhesive to enhance anti-withdrawal characteristics of the nail. The coating is preferably provided with a colorant to further distinguish the nails from other steel nails.

In a preferred embodiment of the nail 36, the shaft diameter is approximately 0.083 in., the head diameter is approximately 0.238 in., and the ratio of head diameter to shaft diameter is approximately 2.87. The length of each nail 32 is most preferably one of the following dimensions: 1.50 in., 1.75 in., 2 in., or 2¼ in.

While preferred embodiments of the invention have been shown and described, it is evident that variations and modifications are possible that are within the spirit and scope of the preferred embodiments described herein. The disclosed embodiments have been provided solely to illustrate the principles of the invention and should not be considered limiting in any way.

What is claimed is:

1. A package of collated nails suitable for pallet wooden board securement comprising:

a plurality of nails suitable for pallet securement, each nail having:

a substantially round head having a flat top surface suitable for being driven into a flush relationship with an exterior surface of a pallet wooden board and a bottom surface, the head further having a head diameter, the head diameter providing an enlarged bottom head surface area for engaging the exterior surface of the pallet wooden board to enhance resistance to pallet wooden board separation by head pull through;

a single elongate shank integral with the head and extending from the head bottom surface, the elongate shank farther including a point opposite the head, and a plurality of surface deformations formed on the shank, the surface deformations being configured to provide an enhanced resistance to pallet wooden board separation by withdrawal of the nail shank from a pallet wooden board, the shank further having a substantially round cross-section;

wherein:

each nail is manufactured from steel wire;

each nail has a length defining the distance from the head to the shank point, the length being between 1.50 inches and 2.25 inches;

attachment structure constructed and arranged to temporarily attach the plurality of nails into a package in which the nails are in collated relation;

and the shank diameter is approximately 0.083 in., the head diameter is approximately 0.238 in., and the ratio of head diameter to shank diameter is approximately 2.87.

2. A nail comprising:

a substantially round head having a top and a bottom surface, the head further having a head diameter of approximately 0.238 in., the head diameter providing a bottom head surface area to enhance resistance to head pull through; and a single elongate shank integral with the head and extending from the head bottom surface, the elongate shank further including a point opposite the head, and a plurality of surface deformations formed on the shank, the shank further having a substantially round cross-section having a shank diameter of approximately 0.083 in.;

wherein:

said nail is manufactured from steel wire;

said nail has a length defining the distance from the head to the shank point, the length being between 1.50 inches and 2.25 inches; and a ratio of the head diameter to the shank diameter of said nail is approximately 2.87.

3. The nail of claim 2 wherein the length is one of the following dimensions: 1.50 in., 1.75 in., 2 in., or 2¼ in.

\* \* \* \* \*